(12) United States Patent
Lu

(10) Patent No.: US 10,690,118 B2
(45) Date of Patent: Jun. 23, 2020

(54) DRIVING FAN DEVICE

(71) Applicant: Shun-Tsung Lu, Taichung (TW)

(72) Inventor: Shun-Tsung Lu, Taichung (TW)

( * ) Notice: Subject to any disclaimer, the term of this patent is extended or adjusted under 35 U.S.C. 154(b) by 24 days.

(21) Appl. No.: 16/106,885

(22) Filed: Aug. 21, 2018

(65) Prior Publication Data

US 2019/0285053 A1    Sep. 19, 2019

(30) Foreign Application Priority Data

Mar. 19, 2018 (TW) .............................. 107203500 U

(51) Int. Cl.
*F03D 9/00* (2016.01)
*F03D 9/20* (2016.01)
*F03D 1/06* (2006.01)

(52) U.S. Cl.
CPC ........... *F03D 9/008* (2013.01); *F03D 1/0658* (2013.01); *F03D 1/0683* (2013.01); *F03D 9/20* (2016.05); *F05B 2240/31* (2013.01); *Y02E 10/28* (2013.01); *Y02E 10/72* (2013.01)

(58) Field of Classification Search
CPC ...... F03D 9/008; F03D 1/0683; F03D 1/0658; F03D 9/20; F03D 3/02; F03D 3/061; F03D 3/067; Y02E 10/72; Y02E 10/28; F05B 2240/31; F05B 2210/16; F05B 2210/18; F03B 1/00
See application file for complete search history.

(56) References Cited

U.S. PATENT DOCUMENTS

| 7,083,382 | B2 * | 8/2006 | Ursua | F03D 3/005 416/110 |
| 7,855,468 | B2 * | 12/2010 | Lin | F03B 17/065 290/43 |
| 8,083,483 | B1 * | 12/2011 | Thorsbakken | F03B 17/065 415/1 |
| 8,272,840 | B2 * | 9/2012 | Yan | F03D 3/061 416/107 |
| 8,419,367 | B2 * | 4/2013 | Fite | F03B 17/065 416/119 |
| 8,496,433 | B2 * | 7/2013 | Yan | F03D 3/067 416/106 |
| 10,378,510 | B2 * | 8/2019 | Margolis | F03D 3/005 |
| 2003/0185666 | A1 * | 10/2003 | Ursua | F03D 3/005 415/4.2 |

(Continued)

*Primary Examiner* — Eldon T Brockman
(74) *Attorney, Agent, or Firm* — Withrow & Terranova, P.L.L.C.

(57) ABSTRACT

A driving fan device has a transmission device and multiple blade assemblies. The transmission device has a transmission seat disposed at a center of the transmission device. The blade assemblies are mounted on the transmission seat. Each one of the blade assemblies has a fixing portion and a tilting portion. The fixing portion is mounted radially on the transmission seat and has a pivotal end and a groove. The pivotal end is disposed away from the transmission seat. The groove is caved inwardly near the pivotal end and has an inner surface. The tilting portion is pivotally connected to the fixing portion and has a rotating part and a forced part. The rotating part is disposed at the tilting portion, is pivotally connected to the pivotal end of the fixing portion, and has an abutting surface corresponding to the inner surface. The forced part is connected to the rotating part.

12 Claims, 9 Drawing Sheets

(56) References Cited

U.S. PATENT DOCUMENTS

| | | | |
|---|---|---|---|
| 2008/0304968 A1* | 12/2008 | Fite | F03B 17/065 416/140 |
| 2008/0309089 A1* | 12/2008 | Lin | F03B 17/065 290/54 |
| 2009/0196749 A1* | 8/2009 | Prentice | F03D 3/067 416/140 |
| 2009/0196753 A1* | 8/2009 | Yan | F03D 3/061 416/147 |
| 2012/0003092 A1* | 1/2012 | Yan | F03D 3/067 416/100 |
| 2017/0045033 A1* | 2/2017 | Margolis | F03D 3/068 |

* cited by examiner

DRIVING FAN DEVICE

BACKGROUND OF THE INVENTION

Field of the Invention

The present invention relates to a driving fan device, and more particularly to a driving fan device that may increase the output torque and enhance the conversion efficiency of electrical power.

Description of Related Art

As thermal power generation has caused global warming, people are urgently looking for better alternatives for thermal power generation. Renewable energies such as wind energy and hydroelectric energy are known for their sustainability and being eco-friendly. Wind power generators and hydroelectric generators both have driving fan devices therein. Propelled by fluid, the driving fan device rotates and generates mechanical power. Then the driving fan device is connected to an electricity generator so as to convert mechanical power into electrical power. In this way, people can turn natural resources into electrical power without doing harm to the environment.

With reference to FIG. 9, a conventional driving fan device 30 has a transmission seat 31 and multiple blades 32. The transmission seat 31 is located at a center of the conventional driving fan device 30. The blades 32 are mounted on and arranged radially around the transmission seat 31 at equi-angular intervals (i.e., equally spaced angular intervals). The blades 32 are one-piece boards or members of the same length and tilt relative to the transmission seat 31. When fluid comes from a specific direction as shown in FIG. 9, a force is exerted on each one of the blades 32. Then the blades 32 each apply a respective torque, the torques being of the same magnitude but in different directions relative to the transmission seat 31.

However, the conventional driving fan device 30 has the shortcoming as follows. The torques applied by the blades 32 are in different directions, wherein each one of the blades 32 located at a right side of the transmission seat 31 as shown in FIG. 9 applies a clockwise torque ($T_r$) to the transmission seat 31, and each one of the blades 32 located at a left side of the transmission seat 31 as shown in FIG. 9 applies a counterclockwise torque ($T_l$) to the transmission seat 31. The clockwise torques ($T_r$) and the counterclockwise torques ($T_l$) offset each other, and make a total torque lower in magnitude compared with the clockwise torque ($T_r$) or the counterclockwise torque ($T_l$). Consequently, the conversion efficiency of the conventional driving fan device 30 decreases, which in turn leads to the reduction of the conversion efficiency of the electrical power.

To overcome the shortcoming, the present invention provides a driving fan device to mitigate or obviate the aforementioned problems.

SUMMARY OF THE INVENTION

The main objective of the present invention is to provide a driving fan device that may increase the output torque and enhance the conversion efficiency of electrical power.

The driving fan device in accordance with the present invention has a center, a transmission device, and multiple blade assemblies. The transmission device is located at the center of the driving fan device and has a center and a transmission seat. The transmission seat is disposed at the center of the transmission device and has an outer surface. The blade assemblies are mounted radially on the outer surface of the transmission seat at equi-angular intervals. Each one of the blade assemblies has a fixing portion and a tilting portion. The fixing portion is mounted radially on the outer surface of the transmission seat and has a side surface, a pivotal end, and a groove. The pivotal end of the fixing portion is disposed on the fixing portion away from the outer surface of the transmission seat. The groove is caved inwardly on the side surface near the pivotal end and has an inner surface. The tilting portion is pivotally connected to the fixing portion and has two ends, a rotating part, and a forced part. The rotating part of the tilting portion is disposed at one of the two ends of the tilting portion, is pivotally connected to the pivotal end of the fixing portion, and has an abutting surface corresponding to the inner surface of the groove of the fixing portion. The forced part of the tilting portion is connected to the rotating part.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
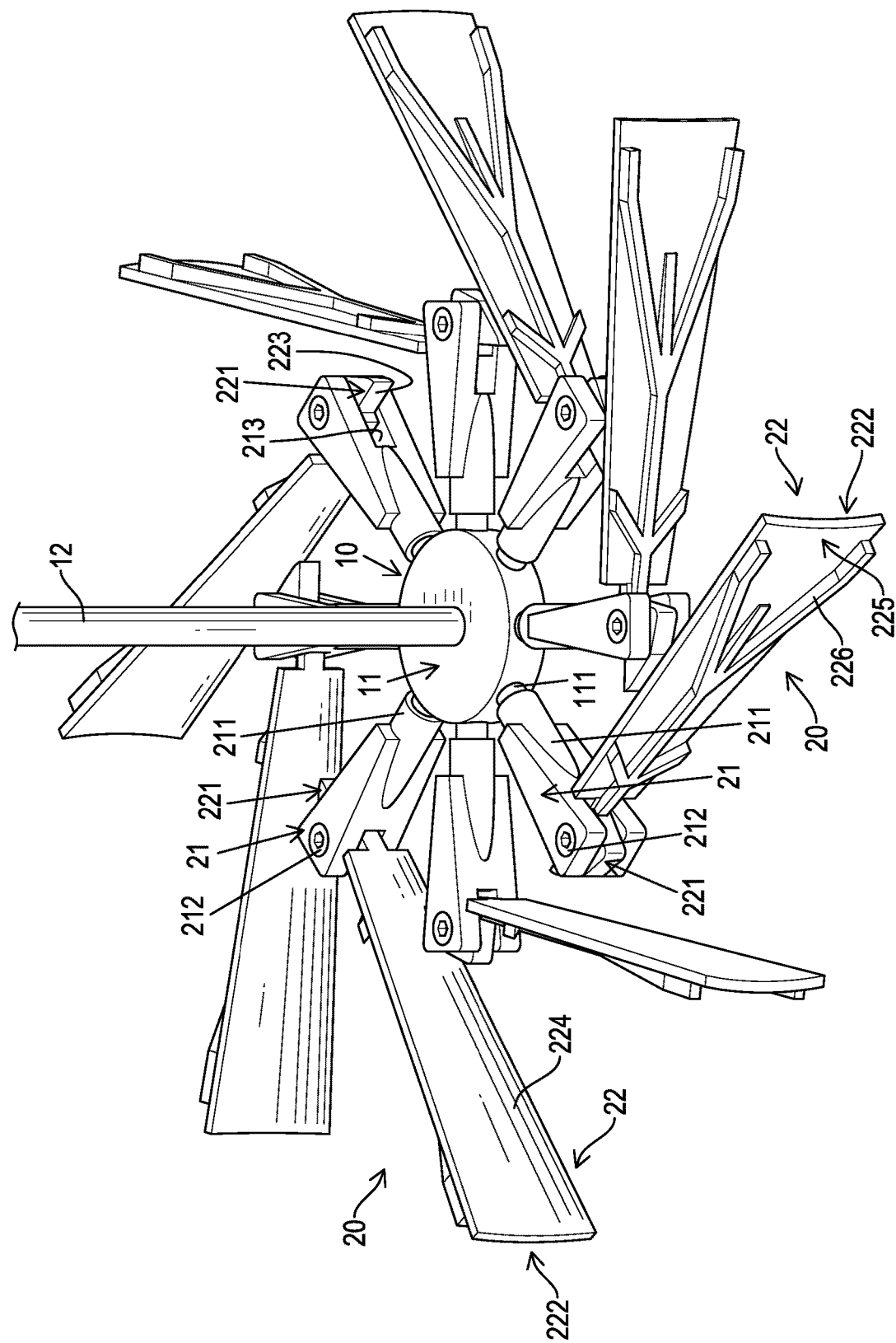
FIG. 1 is a perspective view of a first embodiment of a driving fan device in accordance with the present invention.
Figure 2:
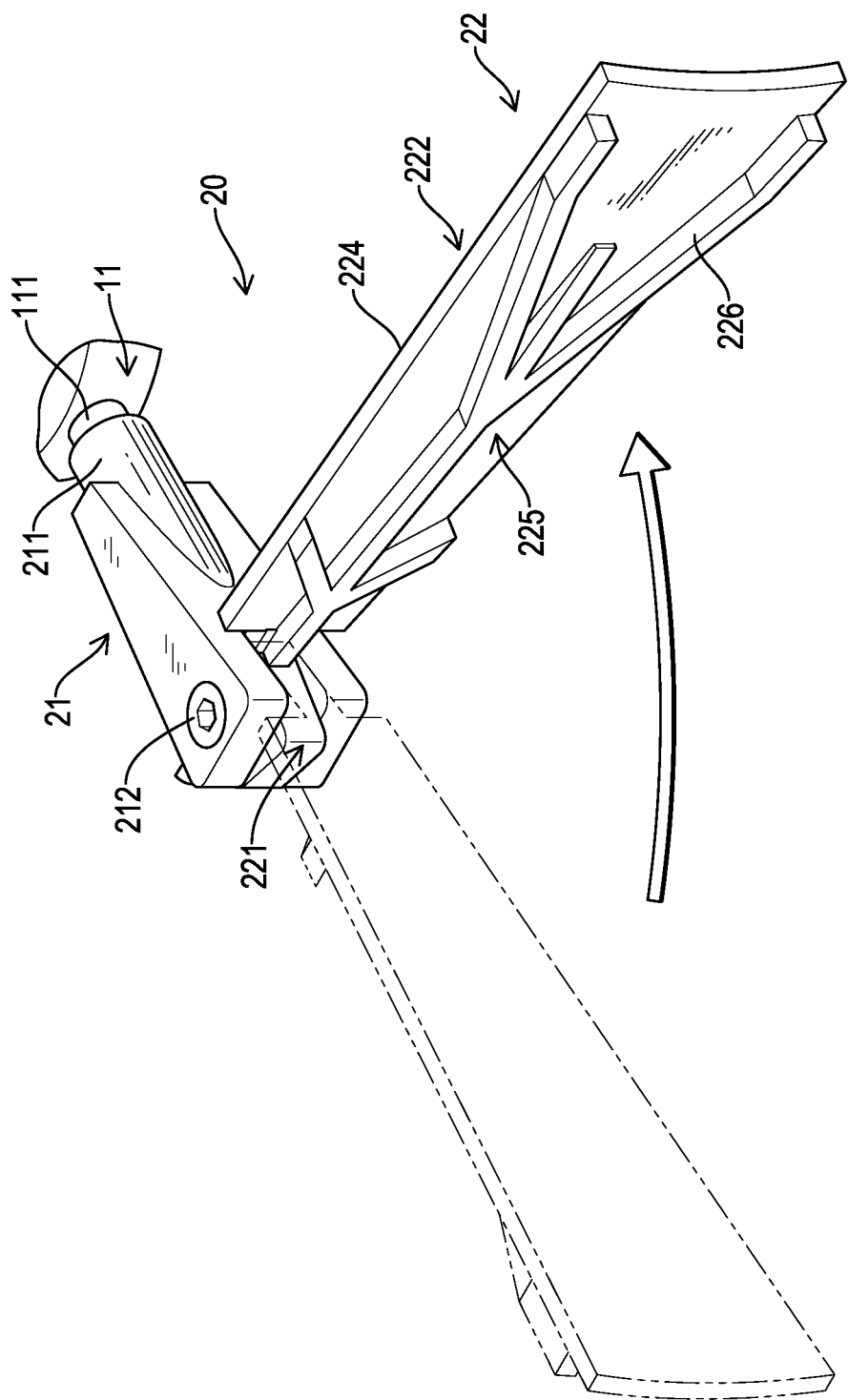
FIG. 2 is an enlarged operational perspective view in partial section of the driving fan device in FIG. 1.
Figure 3:
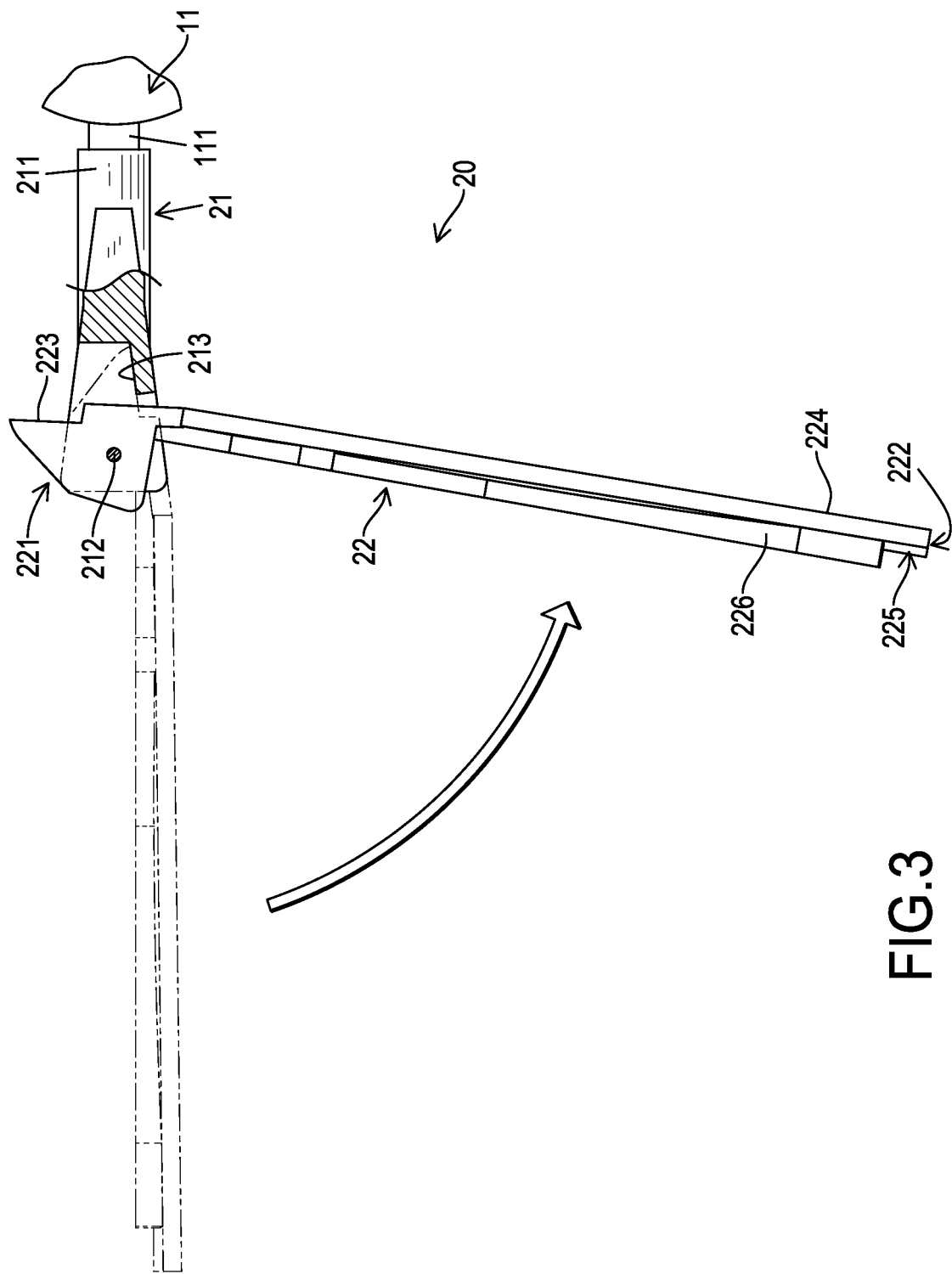
FIG. 3 is an enlarged operational top side view in partial section of the driving fan device in FIG. 1.

With reference to FIGS. 1 to 3, a first embodiment of a driving fan device in accordance with the present invention comprises a center, a transmission device 10, and multiple blade assemblies 20.

The transmission device 10 is located at the center of the driving fan device, and has a center, a transmission seat 11, and a shaft 12. The transmission seat 11 is disposed at the center of the transmission device 10 and has an outer surface, a top surface, and multiple connecting rods 111. The connecting rods 111 are mounted radially on the outer surface of the transmission seat 11 at equi-angular intervals. The shaft 12 is mounted axially on the top surface of the transmission seat 11 to fix the driving fan device.

With reference to FIGS. 1 to 3, the blade assemblies 20 are mounted radially on the outer surface of the transmission seat 11 at equi-angular intervals. Each one of the blade assemblies 20 has a fixing portion 21 and a tilting portion 22. The fixing portion 21 is mounted radially on the outer surface of the transmission seat 11 and has a side surface, a connecting end 211, a pivotal end 212, and a groove 213. The connecting end 211 of the fixing portion 21 is formed as an installation groove corresponding to one of the connecting rods 111. The connecting end 211 of the fixing portion 21 is located around one of the connecting rods 111 so as to connect the fixing portion 21 to the transmission seat 11. The pivotal end 212 is disposed oppositely to the connecting end 211 of the fixing portion 21. With reference to FIG. 3, the groove 213 is caved inwardly on the side surface of the fixing portion 21 adjacent to the pivotal end 212 and has an inner surface.

With reference to FIGS. 2 and 3, in each blade assembly 20, the tilting portion 22 is pivotally connected to the fixing portion 21, and the tilting portion 22 can rotate about the pivotal end 212 and relative to the fixing portion 21. The tilting portion 22 has two ends, a rotating part 221, and a forced part 222. The rotating part 221 is disposed at one of the two ends of the tilting portion 22 and is pivotally connected to the pivotal end 212 of the fixing portion 21. The rotating part 221 has an abutting surface 223 corresponding to the inner surface of the groove 213. The tilting portion 22 can rotate relative to the fixing portion 21, about the pivotal end 212, in a counterclockwise direction as shown in FIG. 3. Also, the tilting portion 22 can rotate relative to the fixing portion 21, about the pivotal end 212, in a clockwise direction as shown in FIG. 3 until the abutting surface 223 of the rotating part 221 of the tilting portion 22 abuts against the inner surface of the groove 213 of the fixing portion 21. The rotating part 221 of the tilting portion 22 is therefore received in the groove 213 of the fixing portion 21, which stops the tilting portion 22 from rotating relative to the fixing portion 21 in a clockwise direction as shown in FIG. 3. The tilting portion 22 aligns with the fixing portion 21 when the rotating part 221 is received in the groove 213 of the fixing portion 21.

The forced part 222 is connected to the rotating part 221 and is in a shape of a board. The forced part 222 has a counter-streamwise side 225 and a streamwise side 224. The counter-streamwise side 225 faces the abutting surface 223 of another one of the blade assemblies 20 and has a side surface. The streamwise side 224 is disposed on the forced part 222 opposite to the counter-streamwise side 225. In addition, the counter-streamwise side 225 has multiple ribs 226 protruding separately on the side surface of the counter-streamwise side 225 to increase the structural strength of the forced part 222. Furthermore, each one of the multiple ribs 226 extends along a direction parallel to the counter-streamwise side 225.

Figure 4:
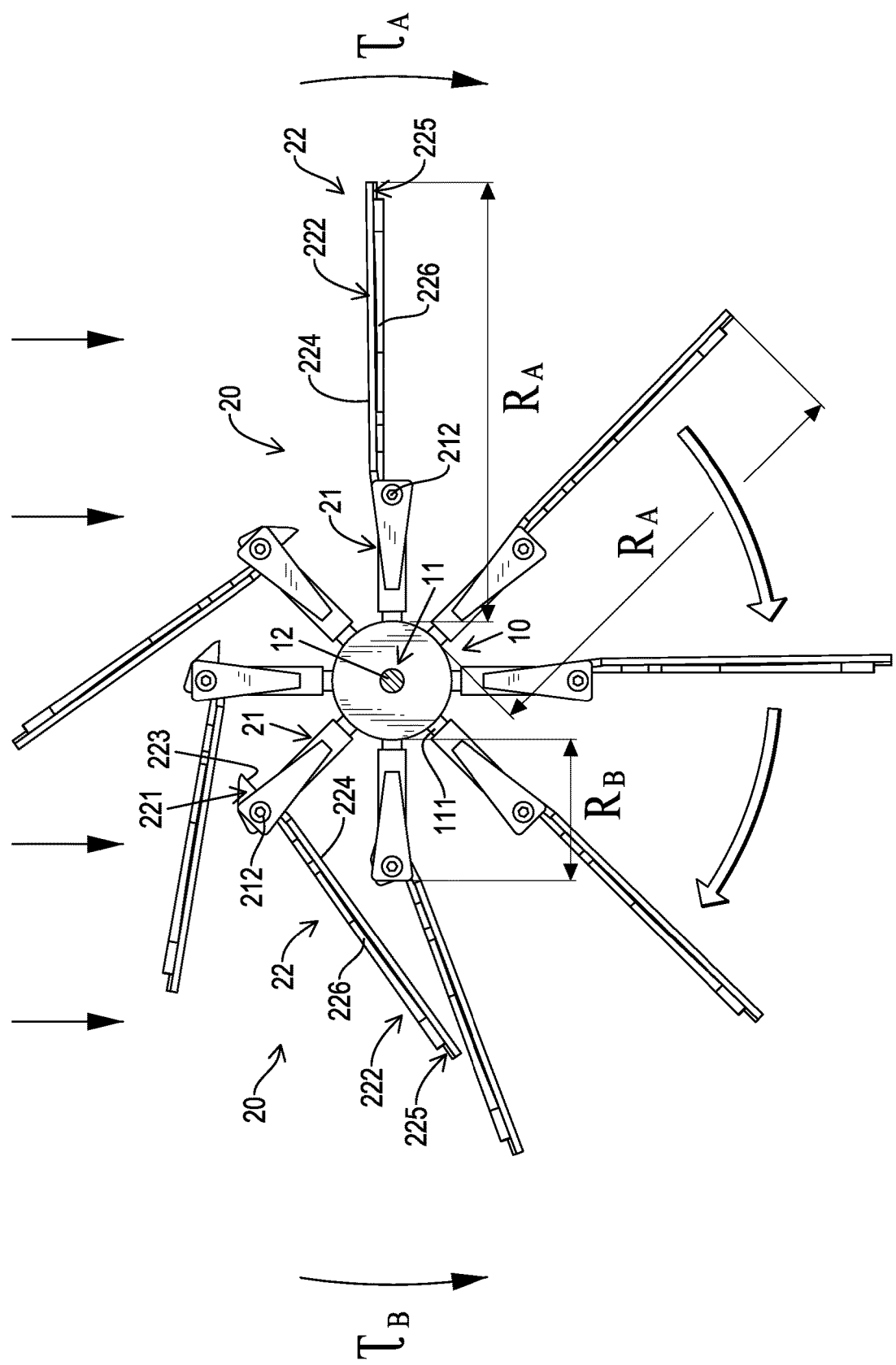
FIG. 4 is another operational top side view of the driving fan device in FIG. 1.

With reference to FIGS. 3 and 4, when fluid comes from a specific direction, a force is exerted on the tilting portions 22. For the tilting portion 22 of each one of the blade assemblies 20 that faces the fluid with the streamwise side 224, the tilting portion 22 rotates relative to the fixing portion 21, about the pivotal end 212, in a clockwise direction as shown in FIG. 4 until the abutting surface 223 of the rotating part 221 abuts against the inner surface of the groove 213. Then the tilting portion 22 aligns with the fixing portion 21, and the tilting portion 22 forms a lever arm (RA) together with the fixing portion 21. Bearing the force exerted by the fluid continuously, each one of the blade assemblies 20 that faces the fluid with the streamwise side 224 applies a torque (TA) to the transmission seat 11 in a clockwise direction as shown in FIG. 4.

However, for the tilting portion 22 of each one of the blade assemblies 20 that faces the fluid with the counter-streamwise side 225, the tilting portion 22 rotates relative to the fixing portion 21, about the pivotal end 212, in a counterclockwise direction as shown in FIG. 4 until the tilting portion 22 is bent relative to the fixing portion 21. Thus, each one of the blade assemblies 20 confronting the fluid with the counter-streamwise side 225 has a lever arm (RB) shorter than the lever arm (RA). Having the lever arm (RB) shorter than the lever arm (RA), each one of the blade assemblies 20 confronting the fluid with the counter-streamwise side 225 applies a torque (TB) smaller than the torque (TA) to the transmission seat 11 in a counterclockwise direction as shown in FIG. 4. Being in an opposite direction to and smaller than the torque (TA), the torque (TB) diminishes the magnitude of the torque (TA). Though diminished, the torque (TA) still has a remaining torque magnitude. Thus, the driving fan device shown in FIG. 4 rotates about the transmission seat 11 in a clockwise direction.

Rotating about the transmission seat 11 in a clockwise direction, each one of the blade assemblies 20 that confronts the fluid with the streamwise side 224 initially rotates to another side, which causes the blade assembly 20 to confront the fluid with the counter-streamwise side 225. Then the blade assembly 20 confronting the fluid with the counter-streamwise side 225 has a lever arm (RB) and applies a torque (TB) to the transmission seat 11 in a counterclockwise direction as shown in FIG. 4. When each one of the blade assemblies 20 confronting the fluid with the counter-streamwise side 225 initially rotates to another side and faces the fluid with the streamwise side 224 due to the clockwise rotation of the driving fan device, the blade assembly 20 confronting the fluid with the streamwise side 224 has a lever arm (RA) and applies a torque (TA) to the transmission seat 11 in a clockwise direction as shown in FIG. 4. Under this circulation, the driving fan device keeps rotating in a clockwise direction as shown in FIG. 4. In this way, the driving fan device can output a mechanical energy to an electricity generator that converts mechanical energy into electrical power.

Figure 5:
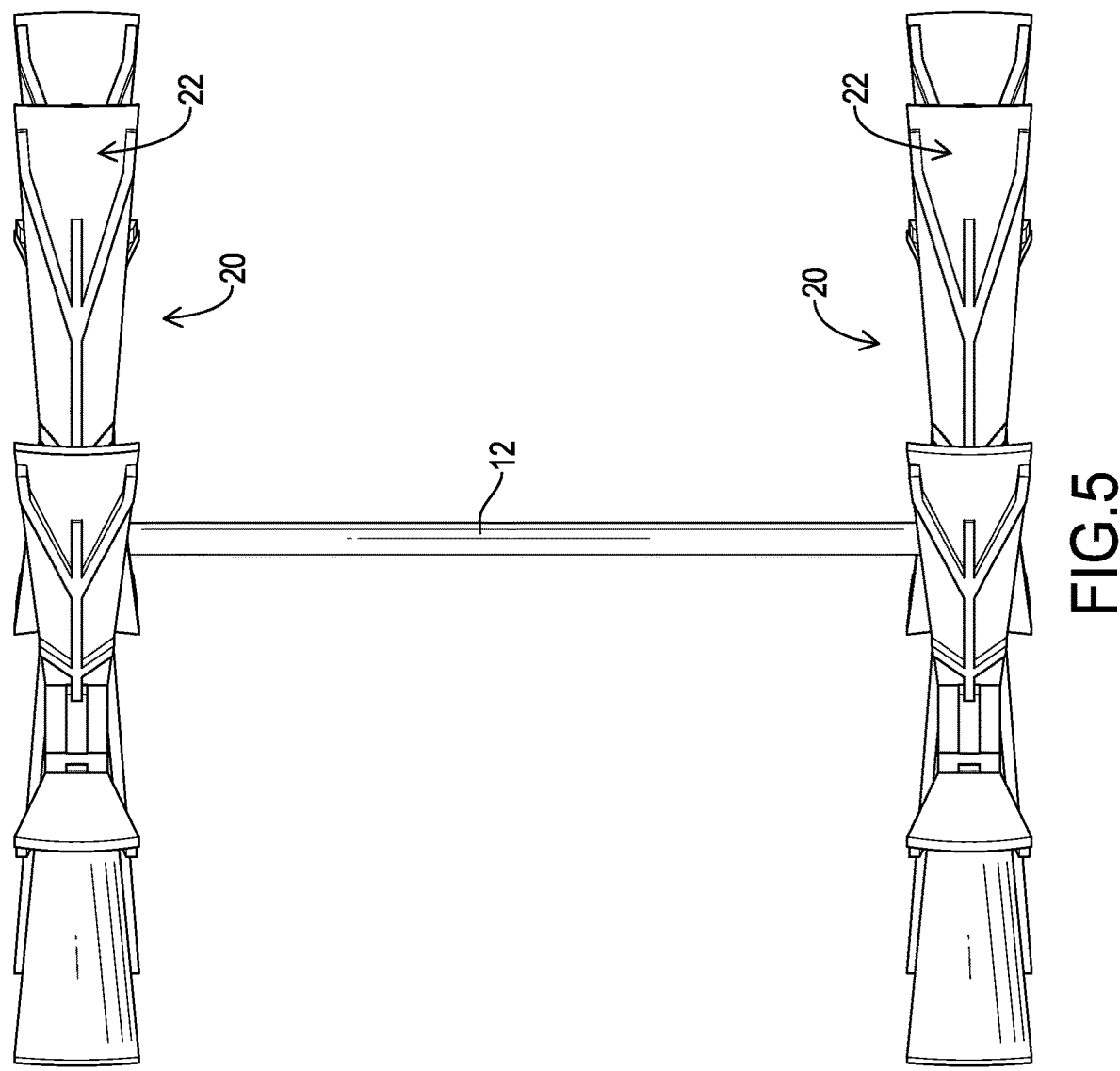
FIG. 5 is a side view of a second embodiment of the present invention.
Figure 8:
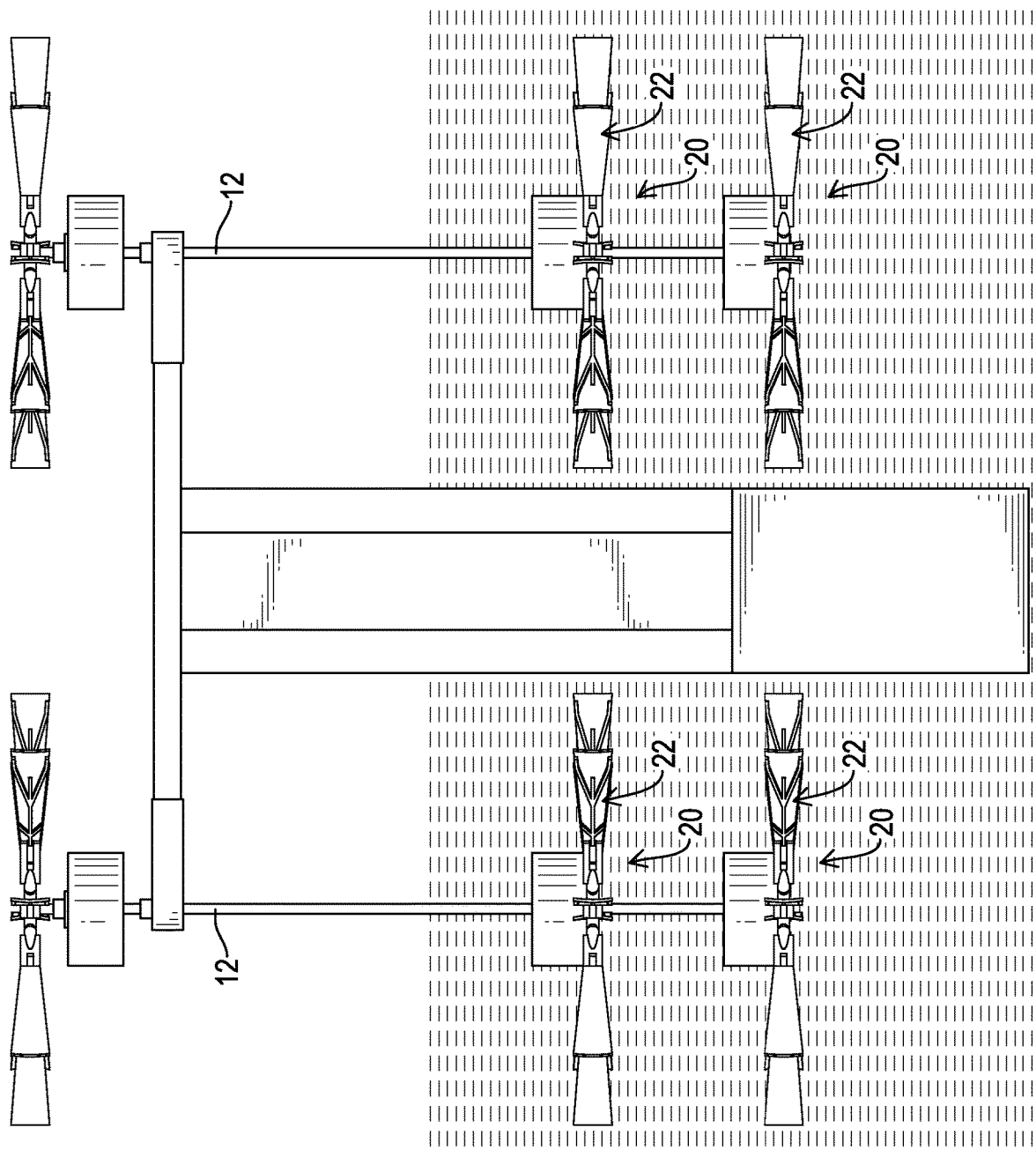
FIG. 8 is an operational side view of a third embodiment of the present invention.
Figure 9:
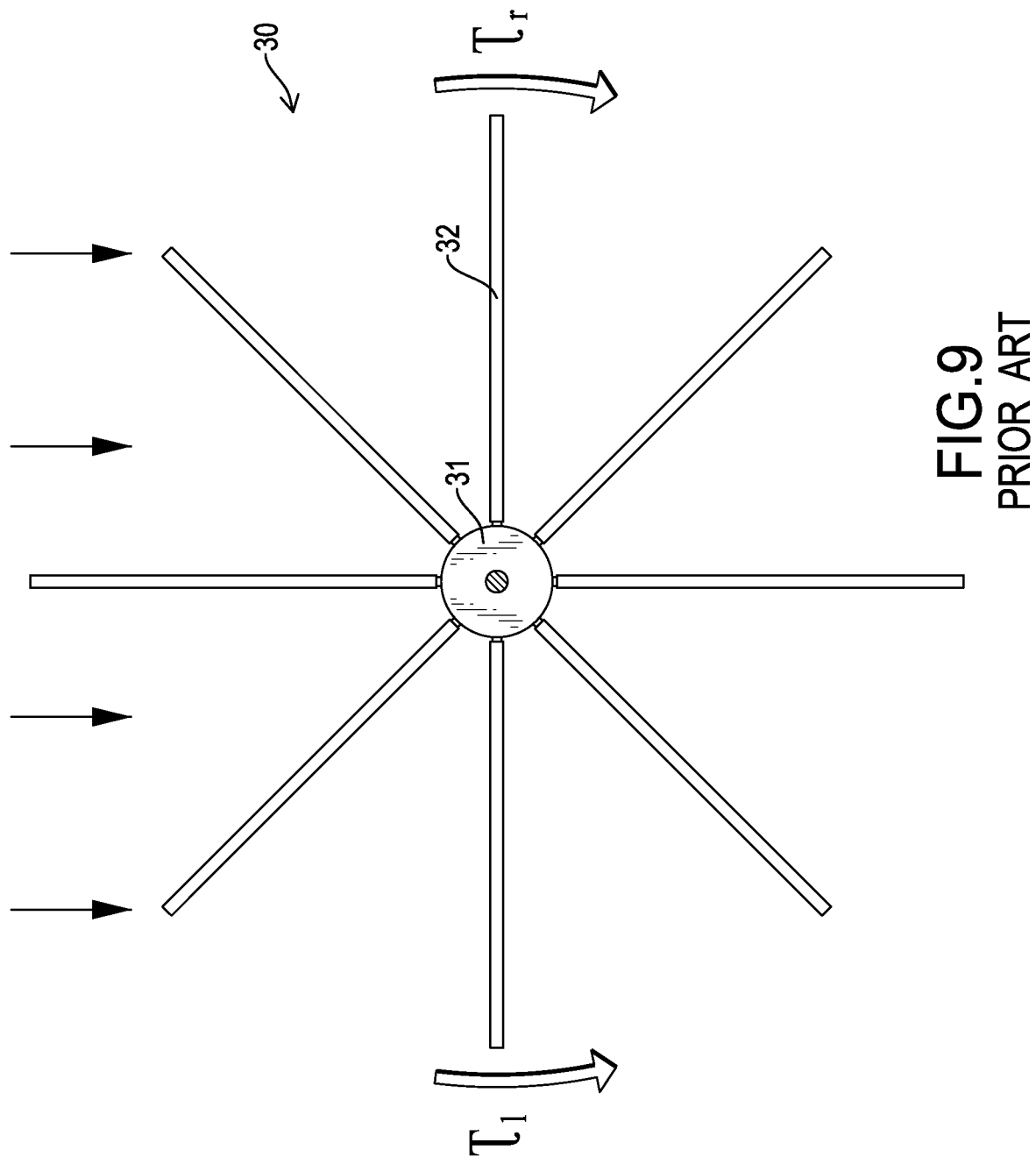
FIG. 9 is a cross-sectional operational top side view in partial section of a driving fan device in accordance with the prior art.

With reference to FIG. 5, in a second embodiment, two said driving fan devices in accordance with the present invention are assembled together via the shaft 12. The shaft 12 has two mounting ends. The transmission seat 11 of each one of the driving fan devices is connected to one of the two mounting ends of the shaft 12, which means the two driving fan devices are disposed at a spaced interval in the second embodiment. The blade assemblies 20 are mounted radially at equi-angular intervals on the outer surface of the transmission seat 11 of each one of the driving fan devices. With reference to FIG. 8, in a third embodiment, three said driving fan devices in accordance with the present invention are assembled together via the shaft 12. The shaft 12 comprises a middle section connecting to one transmission seat 11. The blade assemblies 20 are mounted radially at equi-angular intervals on the outer surface of the transmission seat 11 of each one of the driving fan devices. Furthermore, the invention may have more than three said driving fan devices assembled together, thereby outputting higher torque and enhancing the conversion efficiency of the electrical power.

With the aforementioned technical features, each one of the blade assemblies 20 has the tilting portion 22 and the fixing portion 21 combined together, and the tilting portion 22 can rotate about the pivotal end 212 and relative to the fixing portion 21. Under a specific direction of the fluid, each one of the blade assemblies 20 confronting the fluid with the streamwise side 224 has the lever arm (RA) and applies the torque (TA) to the transmission seat 11, and each one of the blade assemblies 20 confronting the fluid with the counter-streamwise side 225 has the lever arm (RB) and applies the torque (TB) smaller than the torque (TA) to the transmission seat 11. Compared with the conventional driving fan device 30, the blades 32 are one-piece boards or members of the same length and therefore apply the torques of the same magnitude but in different directions relative to the transmission seat 31. In the long run, the clockwise torques (Tr) and the counterclockwise torques (11) offset each other. As a result, the driving fan device of the present invention outputs higher torque than the conventional driving fan device 30 does, and enhances the conversion efficiency of the electrical power due to different amplitudes of the torque (TA) and the torque (TB).

Figure 6:
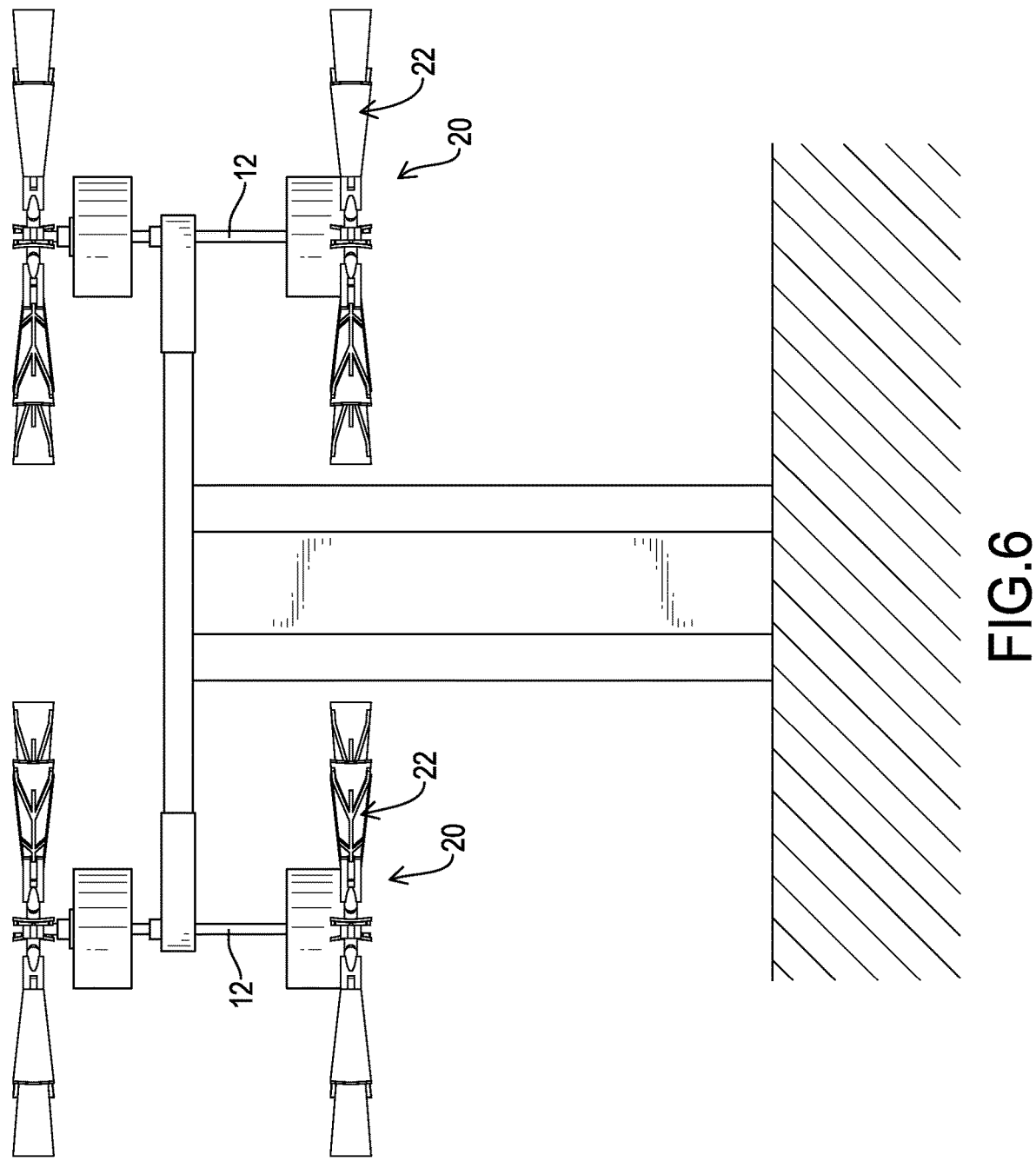
FIG. 6 is an operational side view of the second embodiment in FIG. 5.
Figure 7:
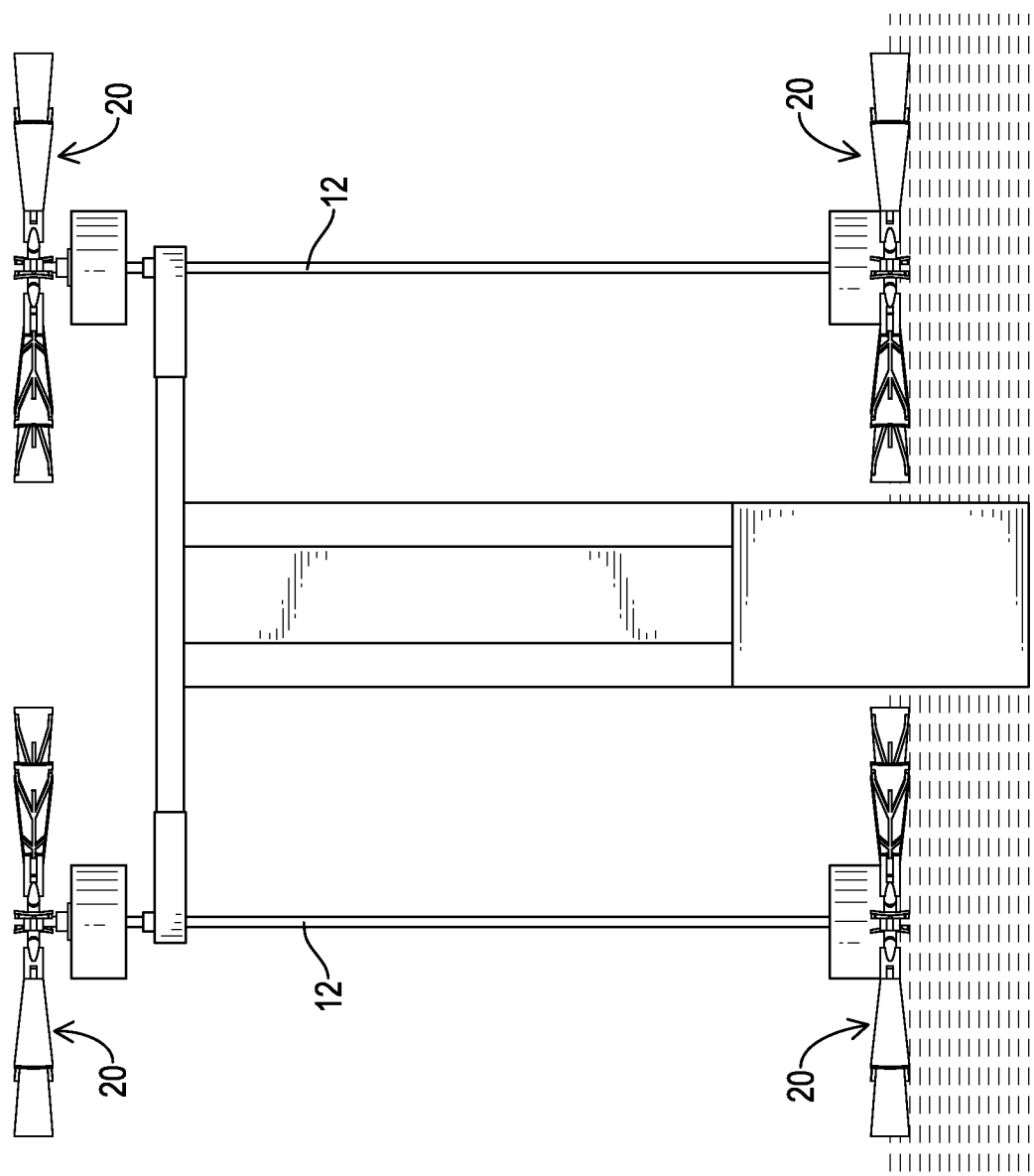
FIG. 7 is another operational side view of the second embodiment in FIG. 5.

With reference to FIG. 6, the driving fan device of the present invention can be utilized in the wind power generator. With reference to FIG. 7, the driving fan device of the present invention can also be utilized both on the land and in water. To use the second embodiment of the driving fan device as shown in FIG. 5, put the driving fan device connected to one of the two mounting ends of the shaft 12 into water, and put the driving fan device connected to the other mounting end of the shaft 12 above the ground or in the air. Then the driving fan device in the present invention can be rotated both by wind and by water. With reference to FIG. 8, two of the driving fan devices can be submerged in water while the other driving fan device can be exposed in the air. On the other hand, the distance between the driving fan devices in the second embodiment can be changed by adjusting the length of the shaft 12, which facilitates the second embodiment of the driving fan device to be used in different environments.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A driving fan device comprising:
   a center;
   a transmission device located at the center of the driving fan device and having
      a center; and
      a transmission seat disposed at the center of the transmission device and having
         an outer surface; and
   multiple blade assemblies mounted radially on the outer surface of the transmission seat at equi-angular intervals, and each one of the blade assemblies having
      a fixing portion mounted radially on the outer surface of the transmission seat and having
         a side surface;
         a pivotal end disposed on the fixing portion away from the outer surface; and
         a groove caved inwardly on the side surface of the fixing portion adjacent to the pivotal end and having
            an inner surface; and
      a tilting portion pivotally connected to the fixing portion and having
         two ends;
         a rotating part disposed at one of the two ends of the tilting portion, being pivotally connected to the pivotal end of the fixing portion, and having
            an abutting surface corresponding to the inner surface of the groove; and
         a forced part connected to the rotating part and having
            a counter-streamwise side facing the abutting surface of another one of the blade assemblies and having
               a side surface; and
               multiple ribs protruding separately on the side surface of the counter-streamwise side, and each one of the multiple ribs extending along a direction parallel to the counter-streamwise side.

2. The driving fan device as claimed in claim 1, wherein each one of the forced parts of the multiple blade assemblies has
   a streamwise side disposed on the forced part opposite to the counter-streamwise side.

3. The driving fan device as claimed in claim 1, wherein the transmission device has
   the transmission seat having a top surface; and
   a shaft mounted axially on the top surface of the transmission seat and having
      two mounting ends.

4. The driving fan device as claimed in claim 2, wherein the transmission device has
   the transmission seat having a top surface; and
   a shaft mounted axially on the top surface of the transmission seat and having
      two mounting ends.

5. The driving fan device as claimed in claim 3, wherein multiple said driving fan devices are assembled together via the shaft, the two mounting ends of the shaft respectively connected to two of the transmission seats, each transmission seat having the blade assemblies mounted radially on the outer surface thereof at equi-angular intervals.

6. The driving fan device as claimed in claim 4, wherein multiple said driving fan devices are assembled together via the shaft, the two mounting ends of the shaft respectively connected to two of the transmission seats, each transmission seat having the blade assemblies mounted radially on the outer surface thereof at equi-angular intervals.

7. The driving fan device as claimed in claim 5, wherein the shaft comprises a middle section connecting to one of the transmission seats.

8. The driving fan device as claimed in claim 7, wherein the fixing portion has a connecting end disposed oppositely to the pivotal end on the fixing portion and mounted radially on the outer surface of the transmission seat.

9. The driving fan device as claimed in claim 8, wherein the transmission seat has multiple connecting rods mounted radially on the outer surface of the transmission seat at equi-angular intervals; and
   the connecting end of each one of the fixing portions is formed as an installation groove corresponding to and located around a respective one of the connecting rods.

10. The driving fan device as claimed in claim 6, wherein the shaft comprises a middle section connecting to one of the transmission seats.

11. The driving fan device as claimed in claim 10, wherein the fixing portion has a connecting end disposed oppositely to the pivotal end on the fixing portion and mounted radially on the outer surface of the transmission seat.

12. The driving fan device as claimed in claim 11, wherein the transmission seat has multiple connecting rods mounted radially on the outer surface of the transmission seat at equi-angular intervals; and the connecting end of each one of the fixing portions is formed as an installation groove corresponding to and located around a respective one of the connecting rods.

\* \* \* \* \*